(12) United States Patent
Seko et al.

(10) Patent No.: US 10,883,544 B2
(45) Date of Patent: Jan. 5, 2021

(54) DOUBLE-ROW SELF-ALIGNING ROLLER BEARING AND PROTRUSION PREVENTION JIG

(71) Applicant: NTN CORPORATION, Osaka (JP)

(72) Inventors: Kazumasa Seko, Kuwana (JP); Takashi Yamamoto, Kuwana (JP); Yasuyuki Inoue, Kuwana (JP); Michio Hori, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/507,661

(22) Filed: Jul. 10, 2019

(65) Prior Publication Data

US 2019/0331165 A1    Oct. 31, 2019

Related U.S. Application Data

(63) Continuation of application No. PCT/JP2018/000378, filed on Jan. 10, 2018.

(30) Foreign Application Priority Data

Jan. 13, 2017    (JP) .................................. 2017-003895
Aug. 23, 2017    (JP) .................................. 2017-160074

(51) Int. Cl.
*F16C 41/04*    (2006.01)
*F16C 35/06*    (2006.01)
(Continued)

(52) U.S. Cl.
CPC ............ *F16C 41/04* (2013.01); *F16C 33/586* (2013.01); *F16C 35/06* (2013.01); *F16C 19/225* (2013.01);
(Continued)

(58) Field of Classification Search
CPC .......... F16C 41/04; F16C 23/06; F16C 23/08; F16C 23/082; F16C 23/084; F16C 23/086;
(Continued)

(56) References Cited

U.S. PATENT DOCUMENTS 3,910,656 A * 10/1975 Price ...................... F16C 33/36
384/558
5,752,775 A     5/1998 Tsutsui et al.
(Continued)

FOREIGN PATENT DOCUMENTS

CN        201144960 Y      11/2008
DE        19957709 A1       6/2000
(Continued)

OTHER PUBLICATIONS

Machine Translation of JP-2007263305-A (Year: 2007).*
(Continued)

*Primary Examiner* — Alan B Waits

(57) ABSTRACT

A double-row self-aligning roller bearing has rollers interposed, in two rows aligned in a bearing width direction, between an inner ring and an outer ring. The outer ring has a spherical raceway surface. Each of the rollers has an outer circumferential surface having a cross-sectional shape that matches the raceway surface of the outer ring. Either or both of shapes and contact angles of the rollers are different from each other. An attachment hole to which a protrusion prevention jig is attachable is provided in an end surface of at least either one of the inner ring and the outer ring. The protrusion prevention jig prevents protrusion of the end surface of the inner ring in the bearing width direction with respect to the end surface of the outer ring.

11 Claims, 14 Drawing Sheets

(51) Int. Cl.
*F16C 33/58* (2006.01)
*F16C 19/38* (2006.01)
*F16C 23/08* (2006.01)
*F16C 19/22* (2006.01)

(52) U.S. Cl.
CPC .............. *F16C 19/38* (2013.01); *F16C 23/08* (2013.01); *F16C 2300/14* (2013.01)

(58) Field of Classification Search
CPC .... F16C 2360/31; F16C 33/586; F16C 33/36; F16C 19/38; F16C 19/225; F16C 23/088; F16C 35/06; F16C 2300/14
See application file for complete search history.

(56) References Cited

U.S. PATENT DOCUMENTS

| | | | |
|---|---|---|---|
| 6,390,685 | B1 | 5/2002 | Shimomura et al. |
| 7,918,649 | B2 | 4/2011 | Nakagawa et al. |
| 2007/0127858 | A1 | 6/2007 | Nakagawa et al. |
| 2012/0269474 | A1* | 10/2012 | Seuberling .............. F16C 41/04 384/560 |
| 2013/0129269 | A1 | 5/2013 | Grehn |
| 2014/0112607 | A1 | 4/2014 | Silverio et al. |

FOREIGN PATENT DOCUMENTS

| | | | |
|---|---|---|---|
| DE | 10 2010 054318 | | 6/2012 |
| DE | 102011086925 A1 | | 5/2013 |
| JP | 2001-065574 | | 3/2001 |
| JP | 2004-108429 | | 4/2004 |
| JP | 2004-245251 | | 9/2004 |
| JP | 2005-061594 | | 3/2005 |
| JP | 2005-207517 | | 8/2005 |
| JP | 2007263305 A | * 10/2007 | .............. F16C 41/04 |
| JP | 200992189 | | 4/2009 |
| JP | 2013-44374 | | 3/2013 |
| WO | WO 2005/050038 | | 6/2005 |

OTHER PUBLICATIONS

International Search Report dated Mar. 20, 2018 in corresponding International Patent Application No. PCT/JP2018/000378.
Translation by WIPO of the International Preliminary Report on Patentability dated Jul. 25, 2019 in corresponding International Patent Application PCT/JP2018/000378.
Chinese Office Action dated Mar. 4, 2020, in corresponding Chinese Patent Application No. 201880006607.7 (16 pages).
Extended European Search Report, dated Sep. 16, 2020, in corresponding European Application No. 18738555.4 (11 pp.).
Office Action, dated Aug. 17, 2020, in corresponding Chinese Application No. 201880006607.7 (8 pp.).

* cited by examiner

DOUBLE-ROW SELF-ALIGNING ROLLER BEARING AND PROTRUSION PREVENTION JIG

CROSS REFERENCE TO THE RELATED APPLICATION

This application is a continuation application, under 35 U.S.C. § 111(a), of international application No. PCT/JP2018/000378, filed Jan. 10, 2018, which claims priority to Japanese patent application No. 2017-003895, filed Jan. 13, 2017, and Japanese patent application No. 2017-160074, filed Aug. 23, 2017, the disclosure of which are incorporated by reference in their entirety into this application.

BACKGROUND OF THE INVENTION

Field of the Invention

The present invention relates to a double-row self-aligning roller bearing to be applied to a usage in which unequal loads are applied to rollers in two rows aligned in a bearing width direction, for example, to a bearing that supports a shaft such as a main shaft of a wind power generator or industrial machinery, and a protrusion prevention jig.

Description of Related Art

On a bearing that supports a main shaft of a wind power generator (a shaft), an axial load due to wind force acts in addition to a radial load due to the weights of each blade and a rotor head, in a state where the bearing is installed into a housing. In the case where the main shaft supporting bearing is a double-row self-aligning roller bearing 41 as shown in FIG. 16, out of rollers 44 and 45 in two rows interposed between an inner ring 42 and an outer ring 43, only the rollers in one row at the rear side with respect to an axial load Fa mainly receive the axial load Fa. That is, whereas the rollers 45 in the one row receive both a radial load and an axial load, the rollers 44 in the other row receive almost only the radial load. Thus, the rollers 45 in the row that receives the axial load have higher contact surface pressure than the rollers 44 in the row that receives only the radial load. As a result, surface damage or wear of rolling surfaces of the rollers 45 and a raceway surface 43a of the outer ring 43 occurs easily, and thus the rolling life thereof is short. Therefore, the substantial life of the entire bearing is determined by the rolling life of the row of the rollers 45 that receive the axial load.

For the above problem, it has been proposed that, as in a double-row self-aligning roller bearing 51 shown in FIG. 17, lengths L1 and L2 of rollers 54 and 55 in two rows interposed between an inner ring 52 and an outer ring 53 are made different from each other, thereby making the load capacity of the rollers 55 in the row that receives an axial load larger than the load capacity of the rollers 54 in the row that hardly receives any of the axial load (Patent Document 1). By setting the roller lengths L1 and L2 such that the load capacities of the rollers 54 and 55 in the respective rows have appropriate magnitudes, the rolling life of the rollers 54 and 55 in the respective rows becomes substantially the same, so that the substantial life of the entire bearing can be improved.

Moreover, it has been proposed, as in a double-row self-aligning roller bearing 61 shown in FIG. 18, contact angles θ1 and θ2 of rollers 64 and 65 in two rows interposed between an inner ring 62 and an outer ring 63 are made different from each other, thereby allowing the rollers 65 having a larger contact angle θ2 to receive a large axial load and allowing the rollers 64 having a smaller contact angle θ1 to receive a large radial load (Patent Document 2). By setting the contact angles θ1 and θ2 such that the load capacities of the rollers 64 and 65 in the respective rows have appropriate magnitudes, the rolling life of the rollers 64 and 65 in the respective rows becomes substantially the same, so that the substantial life of the entire bearing can be improved.

RELATED DOCUMENT

Patent Document

[Patent Document 1] WO2005/050038
[Patent Document 2] US Patent Application Publication No. 2014/0112607

SUMMARY OF THE INVENTION

In the double-row self-aligning roller bearing 51 in which the shapes of the rollers 54 and 55 in the left and right rows are different from each other as shown in FIG. 17 or in the double-row self-aligning roller bearing 61 in which the contact angles θ1 and θ2 of the rollers 64 and 65 in the left and right rows are different from each other as shown in FIG. 18, the center of gravity in the bearing width direction and the center position in the bearing width direction do not coincide with each other. Thus, the bearing is unevenly balanced, and, when assembling the bearing or when installing the bearing to another device, an aligning operation may be automatically made, so that it is necessary to carefully handle the bearing. For example, as shown in FIG. 19, an inner ring 2 and an outer ring 3 are inclined relative to each other with respect to a state where the inner ring 2 and the outer ring 3 confront each other, so that end surfaces 2d and 2c of the inner ring 2 protrude in the bearing width direction with respect to end surfaces 3b and 3c of the outer ring 3. The rollers 4 and 5 move together with the inner ring 2. FIG. 19 shows a double-row self-aligning roller bearing 1 in which the contact angles θ1 and θ2 of the rollers 4 and 5 in the left and right rows are different from each other. Also, in a double-row self-aligning roller bearing in which the shapes of rollers in left and right rows are different from each other, the rollers move in a similar manner.

To prevent the above automatic aligning operation when assembling the double-row self-aligning roller bearing or when installing the double-row self-aligning roller bearing into another device by using a crane, there are a method in which both the inner ring and the outer ring are hung using the crane, a method in which a weight is attached to one or each of the inner ring and the outer ring to maintain balance, etc. However, the former method has a problem in that the work takes time and effort, and the latter method has a problem in that the method lacks stability. Thus, generally, a worker carefully performs work while merely paying attention such that the double-row self-aligning roller bearing does not make an aligning operation, without taking any special countermeasure.

An object of the present invention is to provide a double-row self-aligning roller bearing that is suited to be used in a usage in which an axial load and a radial load are received and loads having magnitudes different from each other act on rollers in two rows aligned in an axial direction and that can prevent an aligning operation from being made automatically when being assembled or when being installed into another device.

Another object of the present invention is to provide a installing method that allows a double-row self-aligning roller bearing to safely and efficiently be installed into another device.

Still another object of the present invention is to provide a protrusion prevention jig that can be used when assembling a double-row self-aligning roller bearing or when installing the double-row self-aligning roller bearing into another device, thereby preventing protrusion of an end surface of an inner ring of the double-row self-aligning roller bearing in a bearing width direction with respect to an end surface of an outer ring of the double-row self-aligning roller bearing due to the inner ring and the outer ring being inclined to each other with respect to a state where the inner ring and the outer ring confront each other.

A double-row self-aligning roller bearing according to the present invention comprises:
an inner ring;
an outer ring having a spherical raceway surface; and
rollers in two rows juxtaposed to each other in a bearing width direction and interposed between the inner ring and the outer ring, each of the rollers in the two rows having an outer circumferential surface having a cross-sectional shape that matches the raceway surface of the outer ring, in which either or both of shapes and contact angles of the rollers in the two rows are different from each other,
an end surface of either or each of the inner ring and the outer ring is formed with an attachment hole, the attachment hole is configured to be attached with a protrusion prevention jig for preventing protrusion of the end surface of the inner ring in the bearing width direction with respect to the end surface of the outer ring due to the inner ring and the outer ring being inclined relative to each other with respect to a state where the inner ring and the outer ring confront each other, is attachable to the attachment hole.

In the double-row self-aligning roller bearing, since either or both of the shapes and the contact angles of the rollers in the two rows are different from each other, the load capacities of the rollers in the respective rows are different from each other. In the case of using the double-row self-aligning roller bearing under a condition that an axial load and a radial load act, the rollers having a higher load capacity are caused to bear substantially the entirety of the axial load and part of the radial load, and the rollers having a lower load capacity are caused to bear the rest of the radial load. By sharing and bearing the axial load and the radial load at such a share ratio by the rollers in the two rows, the contact surface pressures on the rollers in both rows can be made equal to each other. Accordingly, a high load capacity can be ensured in the entire bearing, and the substantial life of the entire bearing can also be improved.

When assembling the double-row self-aligning roller bearing or when installing the double-row self-aligning roller bearing into another device, the protrusion prevention jig is attached to the attachment hole provided in either one of the inner ring and the outer ring. In this state, protrusion of the end surface of the inner ring in the bearing width direction with respect to the end surface of the outer ring due to the inner ring and the outer ring being inclined relative to each other with respect to a state where the inner ring and the outer ring confront each other, is prevented. Thus, work for assembling the bearing or work for installing the bearing can be safely and efficiently performed.

In the present invention, the attachment hole may be a threaded hole. When the attachment hole is a threaded hole, the protrusion prevention jig can be easily and firmly attached.

The double-row self-aligning roller bearing may be used for supporting a main shaft of a wind power generator.

On the double-row self-aligning roller bearing that supports the main shaft of the wind power generator, a radial load due to the weights of blades and a rotor head and an axial load due to wind force act. One roller row, of the rollers in the two rows aligned in the bearing width direction, receives both the radial load and the axial load, and the rollers in the other row receive almost only the radial load. In this case, by using rollers having a higher load capacity as the rollers in the row that receives the axial load and rollers having a lower load capacity as the roller in the row that receives almost only the radial load, the contact surface pressures on the rollers in the respective left and right rows can be made substantially equal to each other.

The double-row self-aligning roller bearing may further include retainers configured to retain the rollers in the respective rows,
in which each retainer includes an annular portion that has an annular shape and is configured to guide axially inner end faces of the rollers in the row, and a plurality of pillar portions that extend in an axial direction from the annular portion and that are provided at predetermined intervals along a circumferential direction,
pockets configured to retain the rollers are provided between those pillar portions, and
one of the retainers configured to retain the rollers in a row that is configured to receive an axial load has an inclination angle by which a radially outer surface of each pillar portion is inclined radially inward from a proximal end side toward a distal end side.

The predetermined intervals recited above refer to intervals optionally determined through design or the like.

In the case where the retainer that retains the rollers in the row that receives the axial load has an inclination angle at which a radially outer surface of each pillar portion is inclined radially inward from a proximal end side toward a distal end side as described above, the pocket surfaces of the retainer can hold the maximum diameter positions of the rollers. Thus, the attitude stability of the rollers in the row that receives the axial load is not deteriorated, and it is also possible to easily fit the rollers.

Each of the rollers may have a DLC coating on a roller rolling surface thereof.

DLC is an acronym for diamond-like carbon.

In this case, wear of the roller rolling surfaces and the respective raceway surfaces of the inner ring and the outer ring hardly occurs, and the wear resistance of each roller can be improved as compared to rollers not having the DLC coating.

Each of the rollers may have a crowning at an end portion of a roller rolling surface thereof. In this case, edge stress can be relaxed.

The inner ring may include an intermediate flange that is provided on an outer circumferential surface of the inner ring between the rollers in the two rows and configured to guide the rollers in the two rows, and small flanges that are provided at opposite ends of the outer circumferential surface, respectively, and that face axially outer end faces of the rollers in the respective rows; and, of the respective small flanges of the inner ring, the small flange that faces the axially outer end faces of the rollers in the row that receives an axial load may have an insertion slot for inserting the rollers into the bearing. Since such an insertion slot is provided, fittability of the rollers in the row that receives an axial load, into the bearing can be further improved.

A method for installing the double-row self-aligning roller bearing of the present invention is a method for installing the double-row self-aligning roller bearing to a shaft or a housing, the method including installing the double-row self-aligning roller bearing into the shaft or the housing in a state where the protrusion prevention jig prevents protrusion of the end surface of the inner ring in the bearing width direction with respect to the end surface of the outer ring due to the inner ring and the outer ring being inclined relative to each other with respect to a state where the inner ring and the outer ring confront each other.

With this installing method, the double-row self-aligning roller bearing can be safely and efficiently installed into the shaft or the housing.

A protrusion prevention jig of the present invention is a protrusion prevention jig to be used for the double-row self-aligning roller bearing, the protrusion prevention jig including: a contact member configured to be placed on each of end surfaces at the same side in the bearing width direction of the inner ring and the outer ring; and a fixing member configured to be inserted into the attachment hole and fix the contact member to one race ring out of the inner ring and the outer ring that is provided with the attachment hole.

When the protrusion prevention jig is used, protrusion of the end surface of the inner ring of the double-row self-aligning roller bearing in the bearing width direction with respect to the end surface of the outer ring of the double-row self-aligning roller bearing due to the inner ring and the outer ring being inclined relative to each other with respect to a state where the inner ring and the outer ring confront each other, is prevented. Thus, work for assembling the double-row self-aligning roller bearing or work for installing the double-row self-aligning roller bearing can be safely and efficiently performed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Embodiments of the present invention will be described with reference to the drawings.

Figure 1:
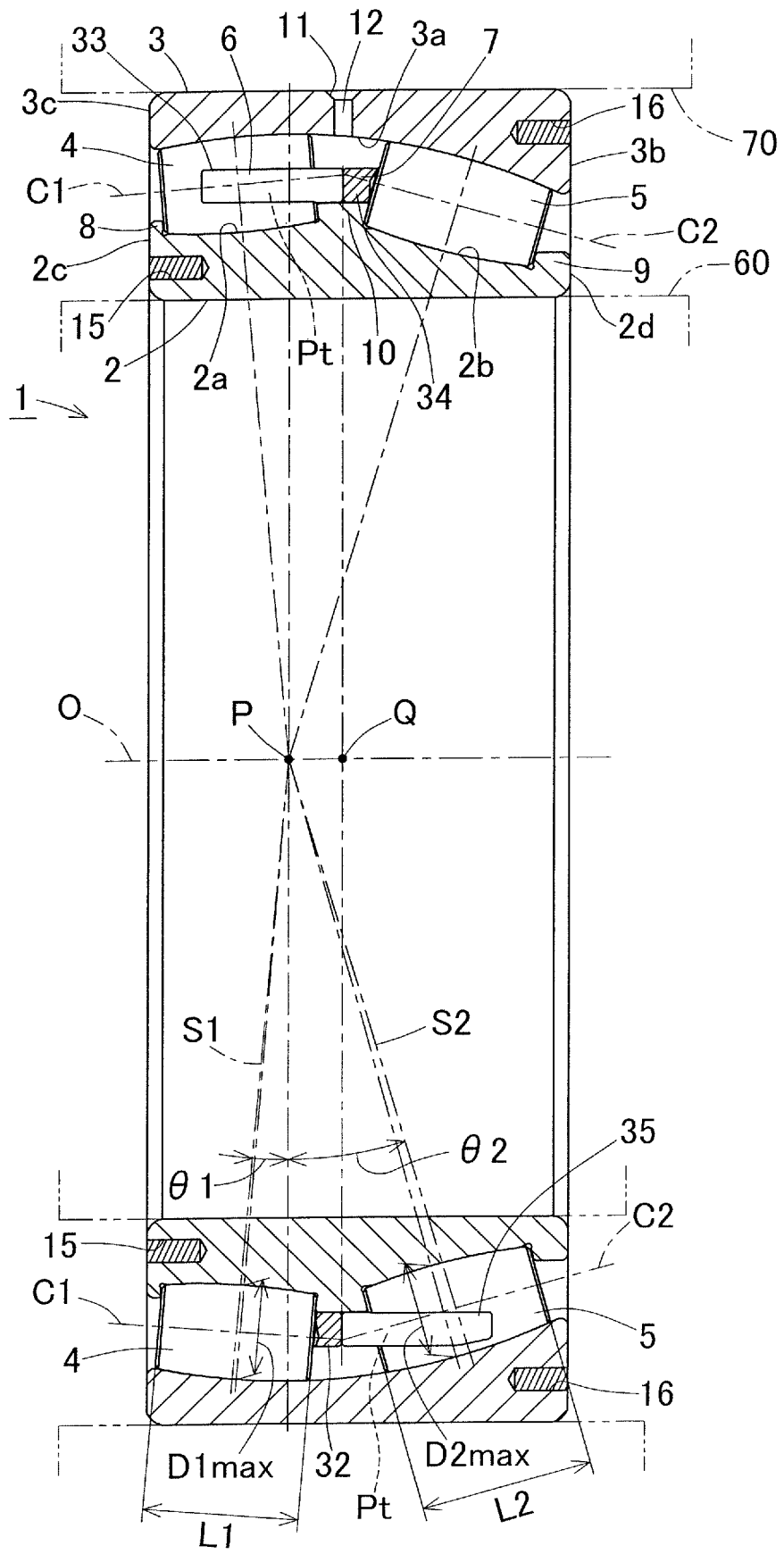
FIG. 1 is a cross-sectional view of a double-row self-aligning roller bearing according to a first embodiment of the present invention.

FIG. 1 is a cross-sectional view of a double-row self-aligning roller bearing according to a first embodiment of the present invention. In the double-row self-aligning roller bearing 1, rollers 4 and 5 in two rows, that is, left and right two rows juxtaposed to each other in a bearing width direction are interposed between an inner ring 2 mounted to a shaft 60 and an outer ring 3 mounted to a housing 70. The outer ring 3 has a spherical raceway surface 3a, and the rollers 4 and 5 in the left and right rows each have an outer circumferential surface having a cross-sectional shape that matches the raceway surface 3a of the outer ring 3. In other words, the outer circumferential surfaces of the rollers 4 and 5 are rotation curved surfaces obtained by rotating, about center lines C1 and C2, a circular arc extending along the raceway surface 3a of the outer ring 3. On the inner ring 2, raceway surfaces 2a and 2b in double rows having cross-sectional shapes along the outer circumferential surfaces of the rollers 4 and 5 in the respective left and right rows are formed. The rollers 4 and 5 in the respective left and right rows are retained by retainers 6 and 7, respectively.

The retainer 6 for the left row includes: an annular portion 32 that has an annular shape and guides the axially inner end faces of the rollers 4 in the left row; and a plurality of pillar portions 33 that extend in the axial direction from the annular portion 32 and are provided at predetermined intervals along the circumferential direction. Pockets Pt for retaining the rollers 4 are provided between those pillar portions. The retainer 7 for the right row includes: an annular portion 34 that has an annular shape and guides the axially inner end faces of the rollers 5 in the right row; and a plurality of pillar portions 35 that extend in the axial direction from the annular portion 34 and are provided at predetermined intervals along the circumferential direction. Pockets Pt for retaining the rollers 5 are provided between those pillar portions.

Flanges (small flanges) 8 and 9 are provided at opposite ends of the outer circumferential surface of the inner ring 2, respectively. An intermediate flange 10 is provided on a center portion of the outer circumferential surface of the inner ring 2, that is, between the rollers 4 in the left row and the rollers 5 in the right row. The inner ring 2 may be provided with no flange. The outer ring 3 has an annular oil groove 11 between the left and right roller rows on the outer circumferential surface thereof, and an oil hole 12 is provided at one location or a plurality of locations in the circumferential direction so as to penetrate from the oil groove 11 to the inner circumferential surface of the outer ring 3.

In the first embodiment, the rollers 4 and 5 in the respective left and right rows have lengths L1 and L2, along the center lines C1 and C2, equal to each other, and also have maximum diameters D1max and D2max equal to each other, and both the rollers 4 and 5 in the respective left and right rows are asymmetrical rollers. The asymmetrical roller is defined as a roller having asymmetrical shape in which the position of the maximum diameter D1max or D2max is shifted from the center of the roller length. In the example in FIG. 1, the position of the maximum diameter D1max of the rollers 4 in the left row is at the right side of the center of the roller length, and the position of the maximum diameter D2max of the rollers 5 in the right row is at the left side of the center of the roller length.

A contact angle θ2 of the rollers 5 in the right row is set so as to be larger than a contact angle θ1 of the rollers 4 in the left row. Since the rollers 4 and 5 in the respective left and right rows are the aforementioned asymmetrical rollers, the contact angles θ1 and θ2 can be changed without changing the positions of the rollers 4 and 5, in contrast to symmetrical rollers (not shown) in each of which the position of the maximum diameter is at the center of the roller length. By adjusting the distance from the center of the roller length to the position of the maximum diameter, an optimum contact angle can be set. In the example in FIG. 1, the distance is set so as to be larger in the rollers 5 in the right row than in the rollers 4 in the left row.

Lines of action S1 and S2 which define the contact angles θ1 and θ2 of the rollers 4 and 5 in the respective rows intersect each other at an aligning center point P on a bearing central axis O. Thus, it is possible for the inner ring 2 and the rollers 4 and 5 to make an aligning operation along the raceway surface 3a of the outer ring 3. The position in the bearing width direction of the aligning center point P is shifted to the side at which the rollers 4 having a smaller contact angle θ1 are present, with respect to a center position Q in the bearing width direction of the intermediate flange 8. The lines of action S1, S2 are defined as lines along which a resultant force of forces acting on contact portions between the rollers 4, 5 and the inner and outer rings 2, 3 acts.

Figure 2:
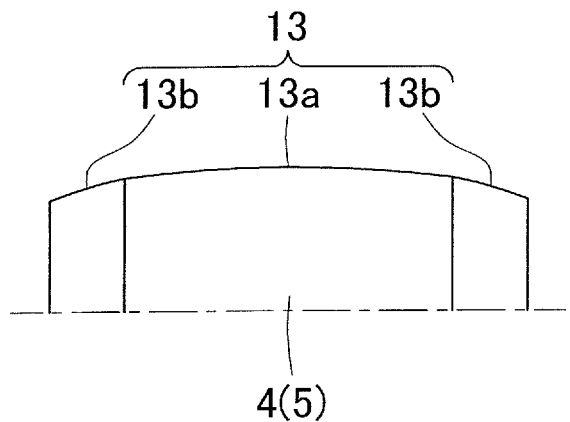
FIG. 2 is an explanatory diagram exaggeratedly representing the shape of a roller of the double-row self-aligning roller bearing.

As shown in FIG. 2, crownings may be provided on the rolling surfaces 13 of either of the rollers 4 or 5 in the left or right rows or the rolling surfaces 13 of both rollers 4 and 5. By providing the crownings, the radii of curvature of opposite end portions 13b and 13c of each rolling surface 13 are made smaller than that of a center portion 13a of the rolling surface 13. The shape of each crowning may be, for example, a logarithmic curve. The shape of each crowning may be a straight line, a single circular arc, or a shape obtained by combining a plurality of circular arcs, other than the logarithmic curve. By providing crownings at both ends of the rolling surfaces 13 of the rollers 4 and 5 as described above, surface pressures on both end portions 13b and 13c of the rolling surfaces 13 of the rollers 4 and 5 at which a sliding velocity is high are decreased, and the absolute value of a PV value (surface pressure×sliding velocity) is reduced, so that friction can be reduced. In particular, crownings are preferably provided to the rollers 5 in the right row in FIG. 1 which receives an axial load.

In the double-row self-aligning roller bearing 1 shown in FIG. 1, as described above, the contact angles θ1 and θ2 of the rollers 4 and 5 in the respective left and right rows are different from each other, thus the center of gravity (not shown) in the bearing width direction and the center position Q in the bearing width direction do not coincide with each other, and the double-row self-aligning roller bearing 1 is unevenly balanced. Thus, there is a possibility that an aligning operation will be automatically made when assembling the double-row self-aligning roller bearing 1 or when installing the double-row self-aligning roller bearing 1 into another device. Therefore, attachment holes 15 and 16 to each of which a protrusion prevention jig (see FIG. 2) for preventing an aligning operation is attachable are each provided at three or more locations in the circumferential direction on an end surface 2c or 3b of the inner ring 2 or the outer ring 3. These attachment holes 15 and 16 are preferably provided on the radially wider end surfaces 2c and 3b among the end surfaces 2c, 2d, 3b, and 3c at both sides in the bearing width direction of the inner ring 2 and the outer ring 3. In this embodiment, the attachment holes 15 and 16 are threaded holes.

Figure 3:
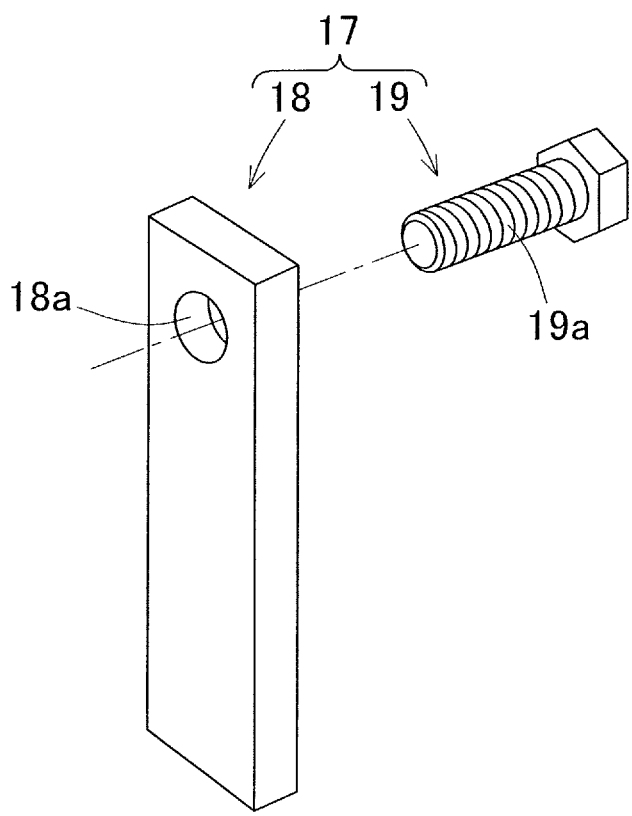
FIG. 3 is an exploded perspective view of a protrusion prevention jig according to the first embodiment of the present invention.

FIG. 3 is an exploded perspective view of a protrusion prevention jig according to the first embodiment. This protrusion prevention jig 17 includes a contact member 18 and a fixing member 19. The contact member 18 is formed as a plate having an elongated shape, and a fixing member insertion hole 18a is provided at one end in the longitudinal direction thereof so as to penetrate in the thickness direction thereof. The fixing member 19 is in the form of a bolt, which can be inserted into the fixing member insertion hole 18a of the contact member 18, and has a threaded portion 19a that can be screwed into the attachment hole 15 or 16, which is in the form of a threaded hole.

Figure 4:
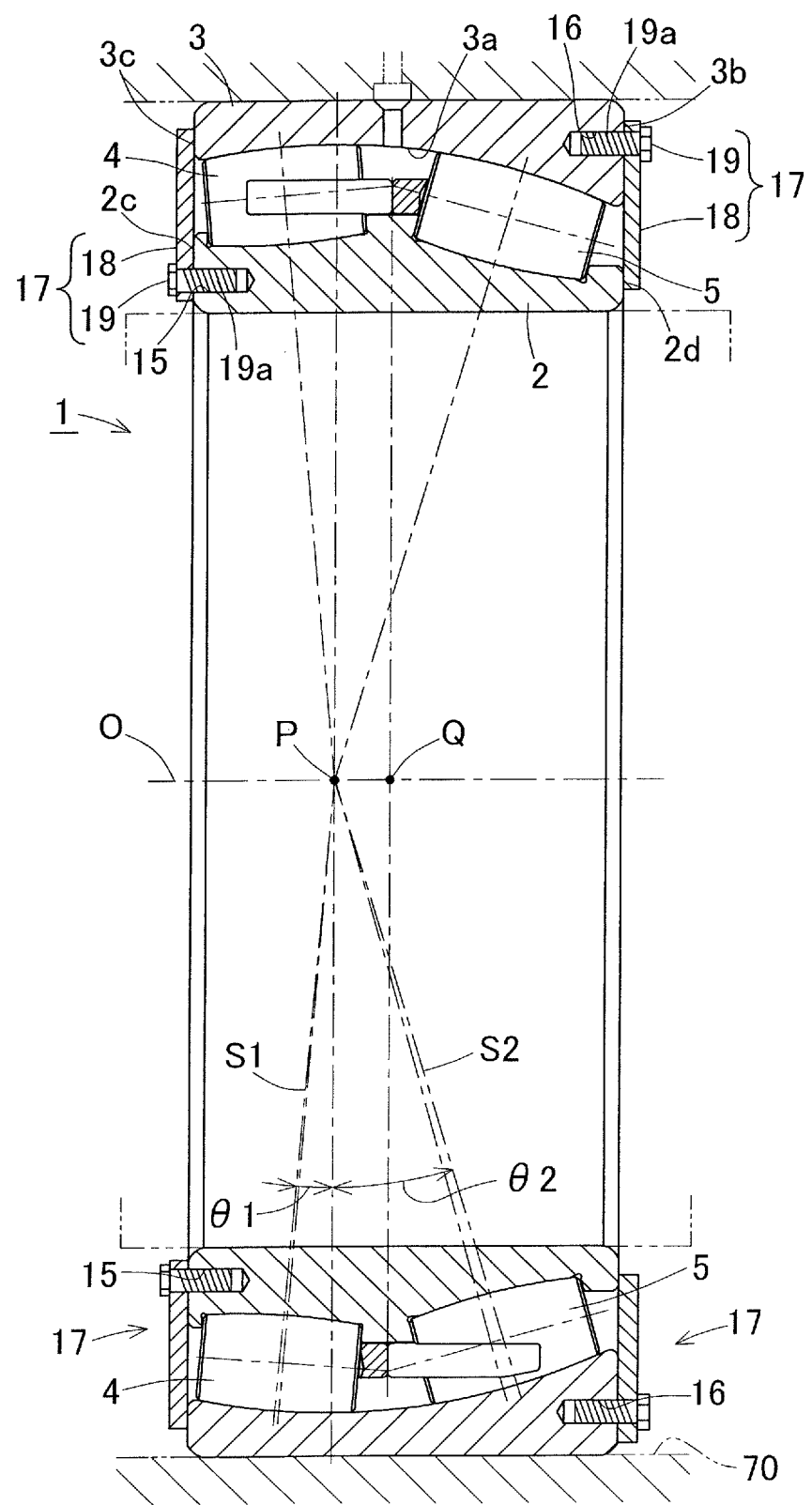
FIG. 4 is a cross-sectional view showing a state where the protrusion prevention jig shown in FIG. 3 is attached to each attachment hole of the double-row self-aligning roller bearing shown in FIG. 1

As shown in FIG. 4, the protrusion prevention jig 17 is attached to each of the attachment holes 15 and 16 of the double-row self-aligning roller bearing 1. That is, the contact member 18 is placed on each of the end surfaces 2c and 3c (or the end surfaces 2d and 3b) at the same side in the bearing width direction of the inner ring 2 and the outer ring 3, and fixed to the inner ring 2 or the outer ring 3 by the fixing member 19. As the fixing method, in a state where the positions in the circumferential direction and the radial direction of the fixing member insertion hole 18a of the contact member 18 and the attachment hole 15 or 16 of the inner ring 2 or the outer ring 3 coincide with each other, the fixing member 19 is inserted into the fixing member insertion hole 18a from the outer side in the bearing width direction, and the threaded portion 19a thereof is screwed into the attachment hole 15 or 16. When the attachment holes 15 and 16 are threaded holes and each fixing member 19 is a bolt, each protrusion prevention jig 17 can be easily and firmly attached.

When the protrusion prevention jigs 17 are attached to the attachment holes 15 and 16 of the double-row self-aligning roller bearing 1 as shown in FIG. 4, inclination of the inner ring 2 and the outer ring 3 relative to each other with respect to a state where the inner ring 2 and the outer ring 3 confront each other is prevented by the contact members 18 of the protrusion prevention jigs 17 coming into contact with the end surfaces 2c and 3c (or the end surfaces 2d and 3b) of the inner ring 2 and the outer ring 3. In other words, protrusion of the end surfaces 2d and 2c of the inner ring 2 in the bearing width direction with respect to the end surfaces 3b and 3c of the outer ring 3 is prevented. The double-row self-aligning roller bearing 1 is installed into the shaft 60 or the housing 70 in a state where the protrusion prevention jigs 17 are attached to the attachment holes 15 and 16. After the installing of the double-row self-aligning roller bearing 1 is completed, the protrusion prevention jigs 17 are detached from the attachment holes 15 and 16.

In the example in FIG. 4, the protrusion prevention jigs 17 are attached to the attachment holes 15 and 16 of both of the inner ring 2 and the outer ring 3. However, the protrusion prevention jigs 17 may be attached to only the attachment holes 15 or the attachment holes 16 of either one of the inner ring 2 and the outer ring 3. In the double-row self-aligning roller bearing 1, the center position Q in the bearing width direction is at the right side in the drawing with respect to the aligning center point P, and thus force that tends to rotate the inner ring 2 and the rollers 4 and 5 along the raceway surface 3a of the outer ring 3 in the bearing width direction relative to the outer ring 3 acts easily. Thus, in the case of attaching the protrusion prevention jigs 17 to only the attachment holes 15 or the attachment holes 16 of either one of the inner ring 2 and the outer ring 3, the protrusion prevention jigs 17 are desirably attached to the attachment holes 16 of the outer ring 3 such that the protrusion prevention jigs 17 receive the force.

In the first embodiment, the attachment holes 15 and 16 of the double-row self-aligning roller bearing 1 are threaded holes and the fixing member 19 of each protrusion prevention jig 17 is a bolt. However, the attachment holes 15 and 16 and the fixing member 19 are not limited thereto. The attachment holes 15 and 16 and the fixing member 19 only need to be configured to allow the contact member 18 to be fixed to the inner ring 2 or the outer ring 3. For example, the attachment holes 15 and 16 may be pin holes, and the fixing member 19 may be a pin that is inserted into the pin hole in a fixed state.

Figure 5:
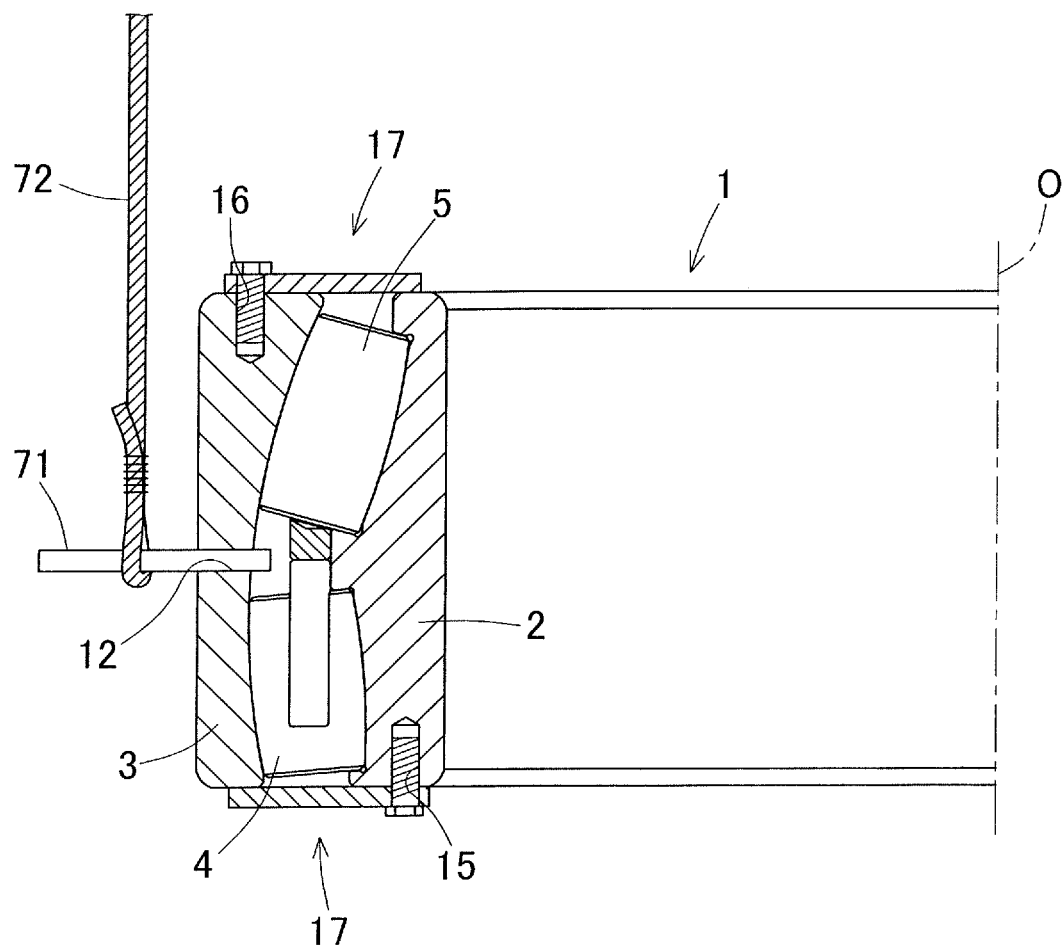
FIG. 5 is a partial diagram showing a state where the double-row self-aligning roller bearing shown in FIG. 4 is hung down using a wire.

When assembling the double-row self-aligning roller bearing 1 or when installing the double-row self-aligning roller bearing 1 into another device, as shown in FIG. 5, the double-row self-aligning roller bearing 1 is brought into an attitude in which the bearing central axis O extends in the up-down direction, a pin 71 is inserted into the oil hole 12 of the outer ring 3, a wire 72 is hooked on the pin 71, and the double-row self-aligning roller bearing 1 is hung down. At this time, when the protrusion prevention jigs 17 are attached to the attachment holes 15 and 16, protrusion of the end surfaces 2d and 2c of the inner ring 2 in the bearing width direction with respect to the end surfaces 3b and 3c of the outer ring 3 due to the inner ring 2 and the outer ring 3 being inclined relative to each other with respect to a state where the inner ring 2 and the outer ring 3 confront each other, is prevented. Thus, work for assembling the double-row self-aligning roller bearing 1 or work for installing the double-row self-aligning roller bearing 1 can be safely and efficiently performed.

The double-row self-aligning roller bearing 1 having this configuration is used in a usage in which an axial load and a radial load are received and loads having magnitudes different from each other act on left and right roller rows, for example, as a bearing for supporting a main shaft of a wind power generator. In this case, the double-row self-aligning roller bearing 1 is mounted such that the rollers 4 in the left row are located at the side closer to revolving blades (the front side) and the rollers 5 in the right row are located at the side farther from the revolving blades (the rear side). Thus, the rollers 5 in the right row having the larger contact angle $\theta 2$ bear substantially the entirety of an axial load and part of a radial load, and the rollers 4 in the left row having the smaller contact angle $\theta 1$ bear the rest of the radial load.

By appropriately setting the contact angles $\theta 1$ and $\theta 2$ of the rollers 4 and 5, the load can be shared at a ratio corresponding to the load capacities of the rollers 4 and 5 in the respective left and right rows. As a result, the surface pressures on the rollers 4 and 5 in the respective left and right rows become equal to each other. Accordingly, a high load capacity can be ensured in the entire bearing, and the substantial life of the entire bearing can also be improved.

In the double-row self-aligning roller bearing 1 of the first embodiment, both the shapes and the contact angles $\theta 1$ and $\theta 2$ of the rollers 4 and 5 in the two rows are different from each other. However, the present invention can also be applied to a double-row self-aligning roller bearing in which only either the shapes or the contact angles of rollers are different from each other. When the shapes are different from each other, the difference is a difference in roller length, a difference in maximum diameter, a difference in symmetrical roller and asymmetrical roller, or the like.

Other embodiments will be described.

In the following description, in each embodiment, portions corresponding to the matters described in the previously described embodiments are designated by the same reference numerals, and the redundant description thereof is omitted. When only a part of a configuration is described, the remaining part of the configuration is the same as that of the previously described embodiment unless otherwise specified. The same advantageous effects are achieved by the same configuration. In addition to the combinations of portions described specifically in each embodiment, it is also possible to partially combine the embodiments unless any problem is particularly posed due to the combination.

Retainer 7A with Inclination Angle

Figure 6:
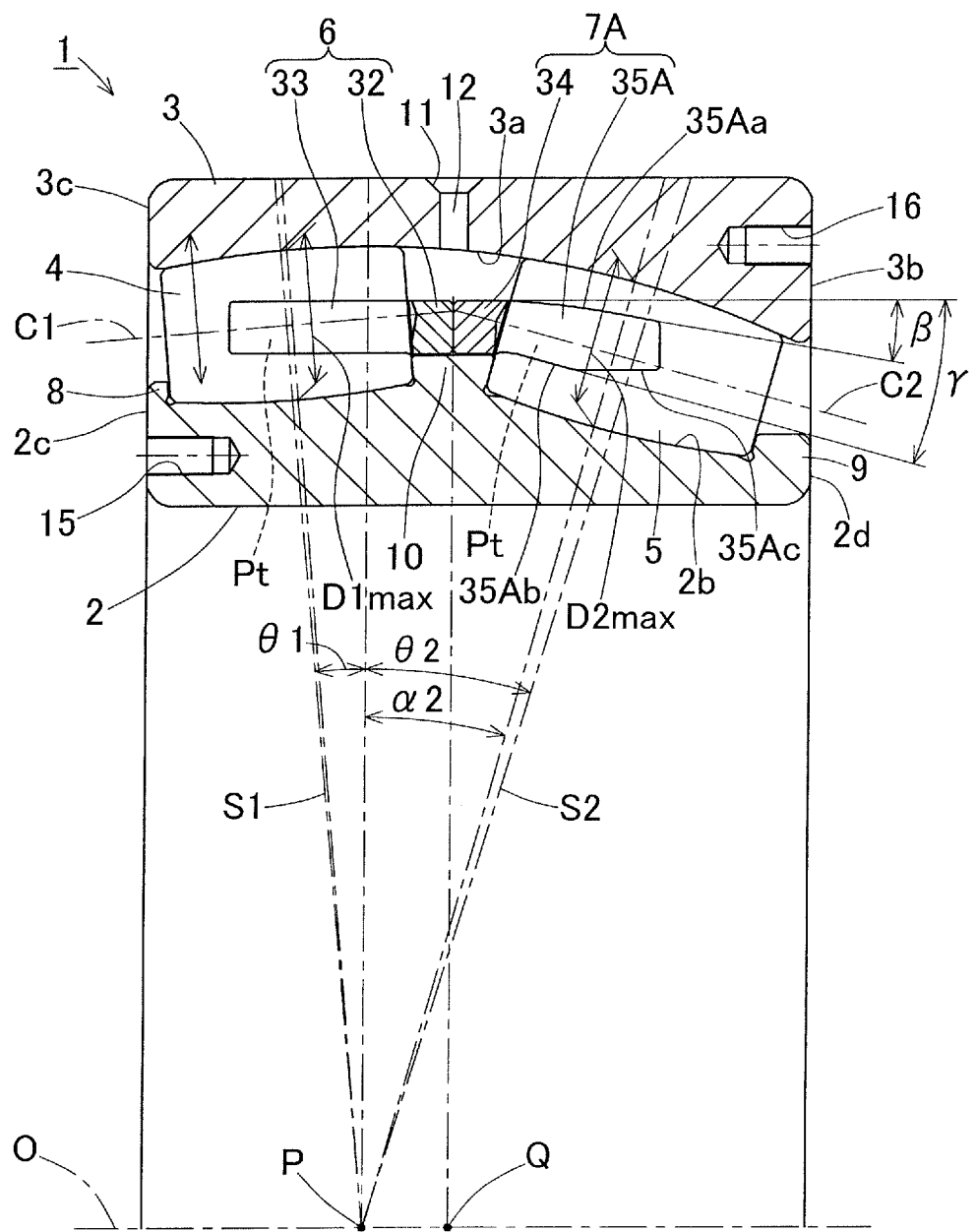
FIG. 6 is a cross-sectional view of a double-row self-aligning roller bearing according to a second embodiment of the present invention.

A double-row self-aligning roller bearing according to a second embodiment will be described with reference to FIG. 6.

The double-row self-aligning roller bearing 1 includes a retainer 7A with an inclination angle. The retainer 7A for the right row shown in FIG. 6 is a retainer for retaining the rollers 5 in the row that receives an axial load. The retainer 7A has an inclination angle β at which a radially outer surface 35Aa of each pillar portion 35A is inclined radially inward from a proximal end side toward a distal end side. The inclination angle β is an angle relative to the bearing central axis O. The inclination angle β of the retainer 7A is set within a range of greater than zero and not greater than a maximum diameter angle α2 of the rollers 5 (0<|≤α2). The maximum diameter angle α2 is an inclination angle, relative to a plane perpendicular to the bearing central axis O, at the position at which the maximum diameter D2max of the rollers 5 in the right row is obtained.

The radially inner surface of each pillar portion 35A in the retainer 7A for the right row in this example has an inclined surface portion 35Ab and a flat surface portion 35Ac connected to the inclined surface portion 35Ab. The inclined surface portion 35Ab extends from the proximal end side of the radially inner surface of the pillar portion 35A to a position near the middle in the axial direction of the radially inner surface, and has an inclination angle γ at which the inclined surface portion 35Ab is inclined radially inward from the proximal end side to the position near the middle in the axial direction. The inclination angle γ is also an angle relative to the bearing central axis O, and is set so as to be not less than the inclination angle β (γ≥β). In this example, the inclination angle γ is set so as to be greater than the inclination angle β by several degrees. However, the relationship between these inclination angles is not limited to this relationship (γ≥β). The flat surface portion 35Ac is a flat surface that extends in the axial direction from the distal edge of the inclined surface portion 35Ab and is parallel to the bearing central axis O. In the retainer 6 for the left row, the radially outer surfaces and the radially inner surfaces of the pillar portions 33 do not have any inclination angle, that is, are parallel to the bearing central axis O.

Since the retainer 7A for the right row has the above-described inclination angle β, the pocket surfaces of the retainer 7A can hold the maximum diameter positions of the rollers 5. Thus, the attitude stability of the rollers 5 in the row that receives an axial load is not deteriorated, and it is also possible to easily fit the rollers 5.

Crowning Cw

Figure 7:
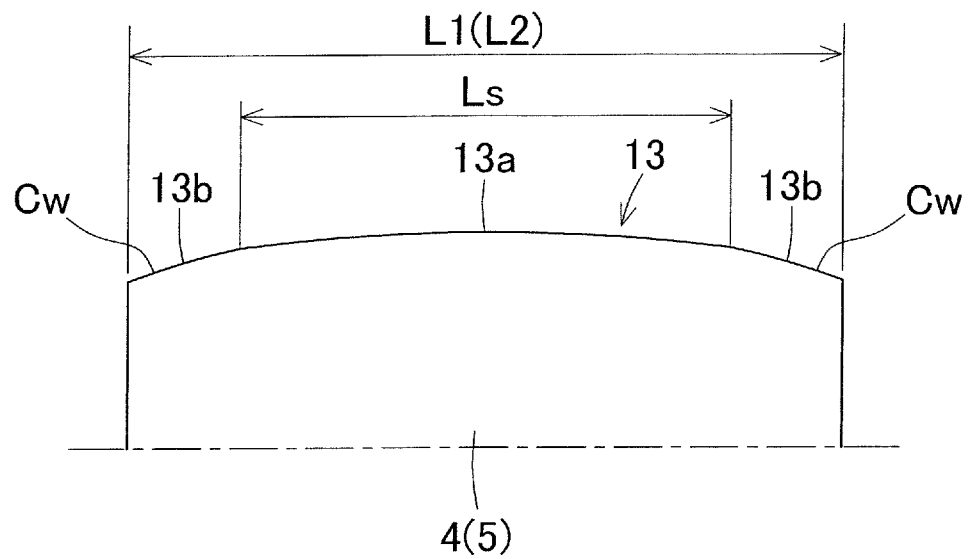
FIG. 7 is an enlarged cross-sectional view showing crownings, etc., of a roller of a double-row self-aligning roller bearing according to a third embodiment of the present invention.

In a double-row self-aligning roller bearing according to a third embodiment, as shown in FIG. 7, the rollers 4 and 5 in the respective left and right rows may each have crownings Cw at the end portions 13b and 13c of the roller rolling surface 13 thereof. As each crowning Cw in this example, a complex R crowning that increases a drop amount by making the end portion 13b or 13c of the roller rolling surface 13 smaller than a reference R of the roller rolling surface 13 is used. A length Ls of a roller center portion 13a at which no crowning Cw is provided (hereinafter, referred to as "straight length") may be 50% to 70% and preferably 60% of a roller overall length L1 (L2).

Figure 8:
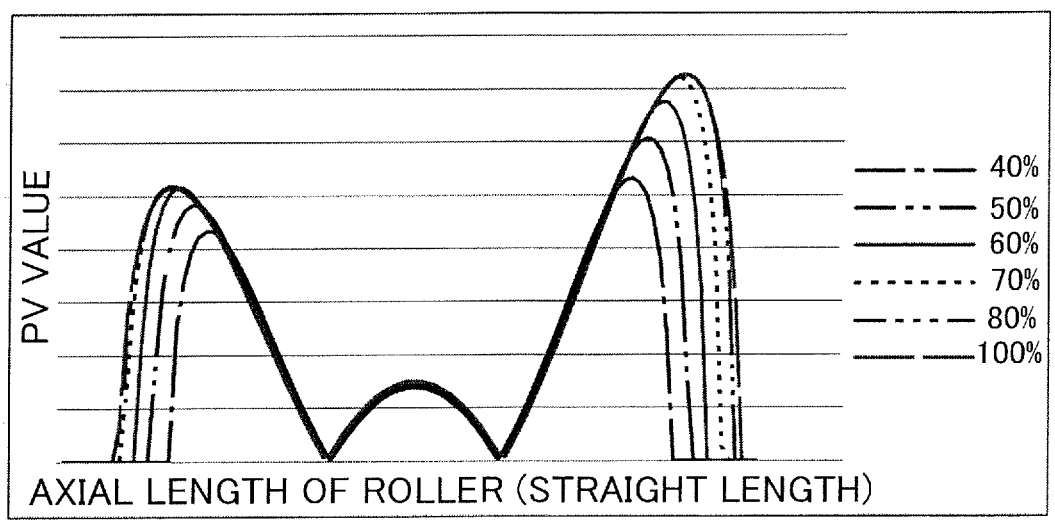
FIG. 8 is a diagram showing a relationship between a straight length and a PV value of the roller.
Figure 9:
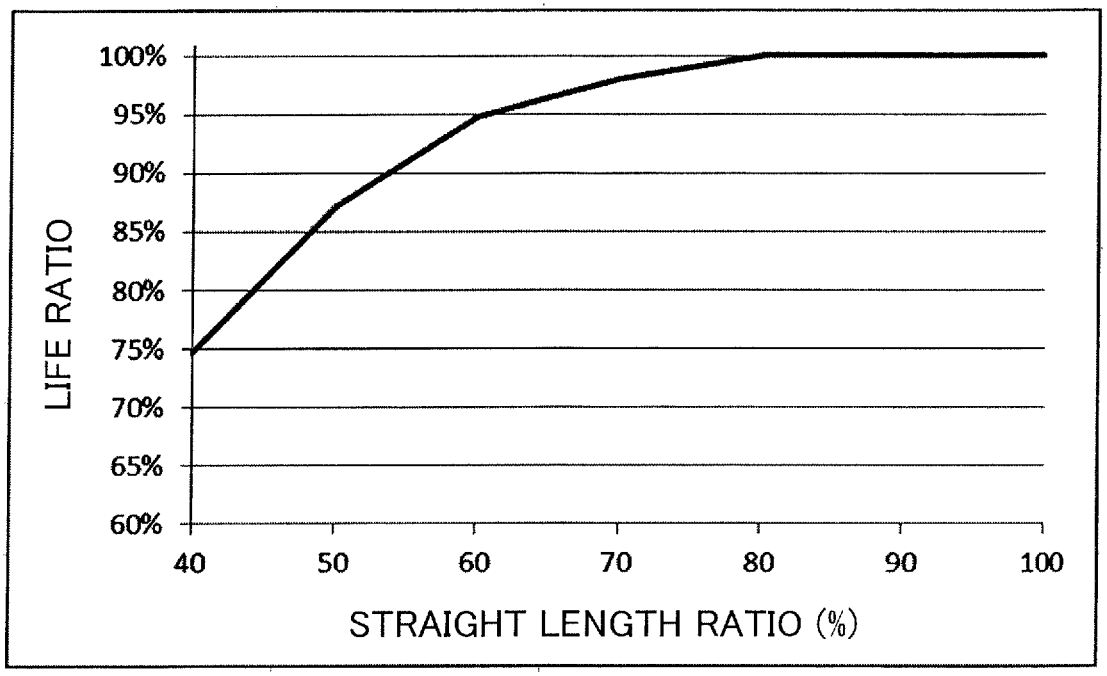
FIG. 9 is a diagram showing a relationship between the straight length of the roller and bearing life.

FIG. 8 is a diagram showing a relationship between a straight length and a PV value (surface pressure x sliding velocity) when an average wind load is applied to a double-row self-aligning roller bearing for supporting a windmill main shaft. FIG. 9 is a diagram showing a relationship between the straight length and bearing life. From FIG. 8, it is understood that the shorter the straight length is, the lower the PV value is. From FIG. 9, it is understood that, when the straight length is less than 60% of the roller overall length, the life reduction rate exceeds 5% as compared to the case where no crowning is provided (straight length=100%). Therefore, the straight length is preferably 60% of the roller overall length.

In the case where the rollers 4 and 5 in the respective rows have such crownings Cw (FIG. 5), edge stress can be relaxed. Instead of the complex R crowning, a logarithmic crowning in which the end portion 13b or 13c of the roller rolling surface 13 is represented by a logarithmic curve may be used.

DLC Coating

Figure 10:
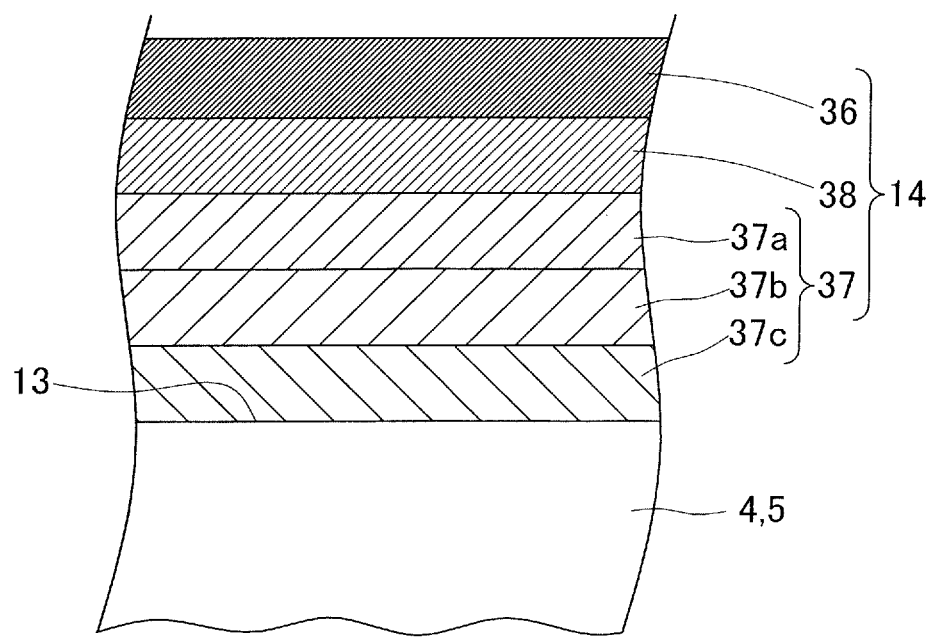
FIG. 10 is an enlarged cross-sectional view of a DLC coating of a roller, etc., of a double-row self-aligning roller bearing according to a fourth embodiment of the present invention.

In a double-row self-aligning roller bearing according to a fourth embodiment, as shown in FIG. 10, the rollers 4 and 5 in the respective rows may each have a DLC coating 14 on the roller rolling surface 13 thereof. In the DLC coating 14 in this example, a multi-layer structure having high adhesion to the roller 4 or 5, which is a base, is used. The DLC coating 14 has a surface layer 36, an intermediate layer 37, and a stress relaxation layer 38. The surface layer 36 is a film in which only graphite that is a solid target is used as a carbon supply source and which is mainly formed of DLC in which an amount of hydrogen mixed is reduced. The intermediate layer 37 is a layer that is formed between the surface layer 36 and the base and is mainly formed of at least Cr or W. The stress relaxation layer 38 is formed between the intermediate layer 37 and the surface layer 36.

The intermediate layer 37 has a structure including a plurality of layers having different compositions, and a three-layer structure of 37a to 37c is shown in FIG. 10. For example, a layer 37c mainly formed of Cr is formed on the surface of the base, a layer 37b mainly formed of W is formed on the layer 37c, and a layer 37a mainly formed of W and C is formed on the layer 37b. In FIG. 10, the three-layer structure is shown, but, as necessary, the intermediate layer 37 may include layers whose number is less than or greater than three.

By the layer 37a adjacent to the stress relaxation layer 38 being mainly formed of carbon and a metal that is the metal of which the layer 37b adjacent to the layer 37a at the other side is mainly composed, the adhesion between the intermediate layer 37 and the stress relaxation layer 38 can be improved. For example, in the case where the layer 37a is mainly formed of W and C, further improvement of the adhesion can be achieved by decreasing the contained amount of W and increasing the contained amount of C from the side at which the intermediate layer 37b mainly formed of W is present, toward the side at which the stress relaxation layer 38 mainly formed of C is present (composition gradient).

The stress relaxation layer 38 is a gradient layer that is mainly formed of C and in which the hardness thereof increases in a continuous or stepwise manner from the intermediate layer 37 side to the surface layer 36 side. Specifically, the stress relaxation layer 38 is a DLC gradient layer that is obtained by using a graphite target in a UBMS method and forming a film while increasing a bias voltage to the base in a continuous or stepwise manner. The reason why the hardness increases in a continuous or stepwise manner is that the distribution ratio of a graphite structure (SP2) and a diamond structure (SP3) in a DLC structure becomes biased due to the increase of the bias voltage such that the latter is increased.

The surface layer 36 is a film that is formed by extension of the stress relaxation layer 38 and mainly formed of DLC, particularly, a DLC film in which a contained amount of hydrogen in the structure thereof is reduced. Since the contained amount of hydrogen is reduced, the wear resistance is improved. To form such a DLC film, a method, in which, for example, a UBMS method is used and a raw material to be used in sputtering, hydrogen, and a compound containing hydrogen are not mixed in sputtering gas, is used.

Regarding the film forming method for the stress relaxation layer 38 and the surface layer 36, the case of using the UBMS method has been described, but any other publicly known film forming method can be adopted as long as it is a film forming method that allows the hardness to be changed in a continuous or stepwise manner. The sum of the film thicknesses of the multiple layers including the intermediate layer 37, the stress relaxation layer 38, and the surface layer 36 is preferably 0.5 µm to 3.0 µm. If the sum of the film thicknesses is less than 0.5 µm, the wear resistance and the mechanical strength are poor, and if the sum of the film thicknesses exceeds 3.0 µm, these layers are easily peeled off. Thus, such cases are not preferable.

In this example, the DLC coating 14 is provided only on the outer circumferential surface of each of the rollers 4 and 5, but a DLC coating 14 may be further provided on each end face of each of the rollers 4 and 5. In particular, in the case where a DLC coating 14 is provided on one end face of each of the rollers 4 and 5 guided by the intermediate flange 10 (FIG. 6), the one end face of each of the rollers 4 and 5 is hardly worn, so that the wear resistance of the rollers 4 and 5 can be further enhanced.

Insertion Slot 20

Figure 11:
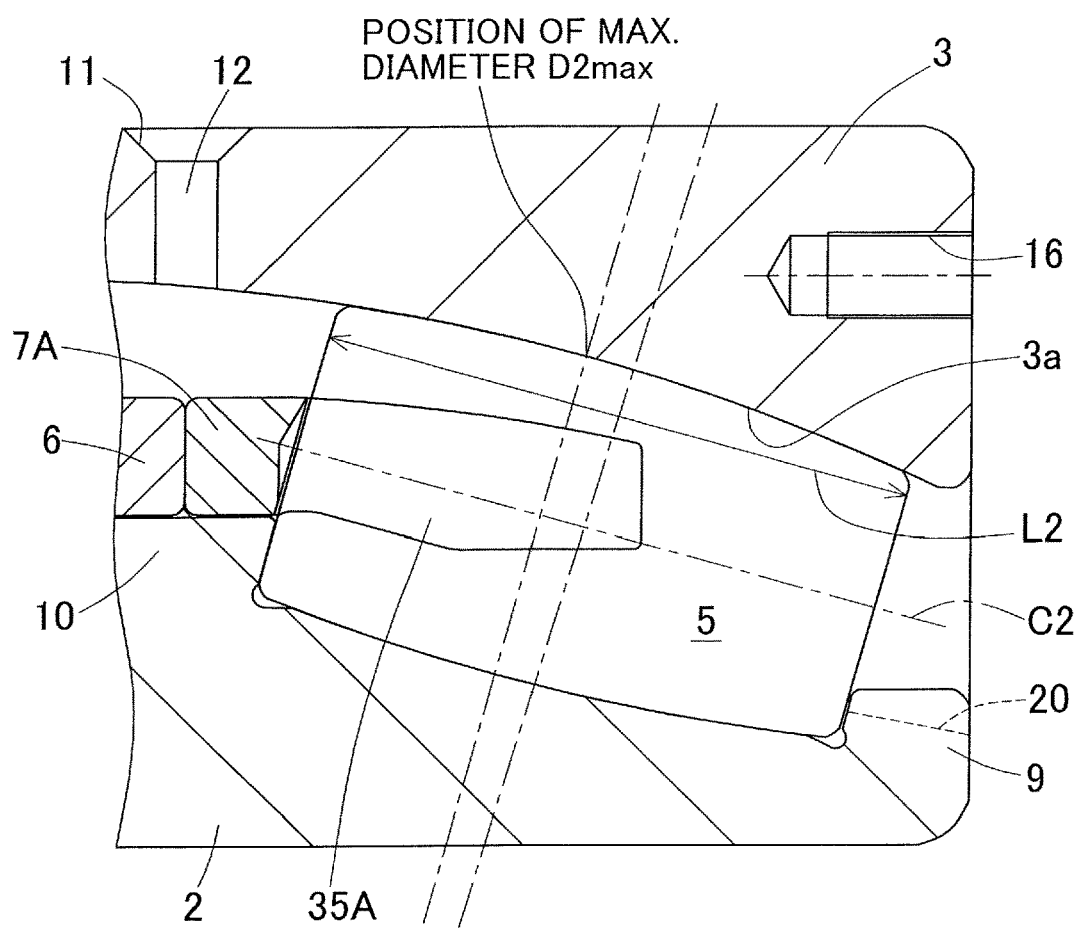
FIG. 11 is an enlarged cross-sectional view showing an insertion slot of an inner ring, etc., of a double-row self-aligning roller bearing according to a fifth embodiment of the present invention.
Figure 12:
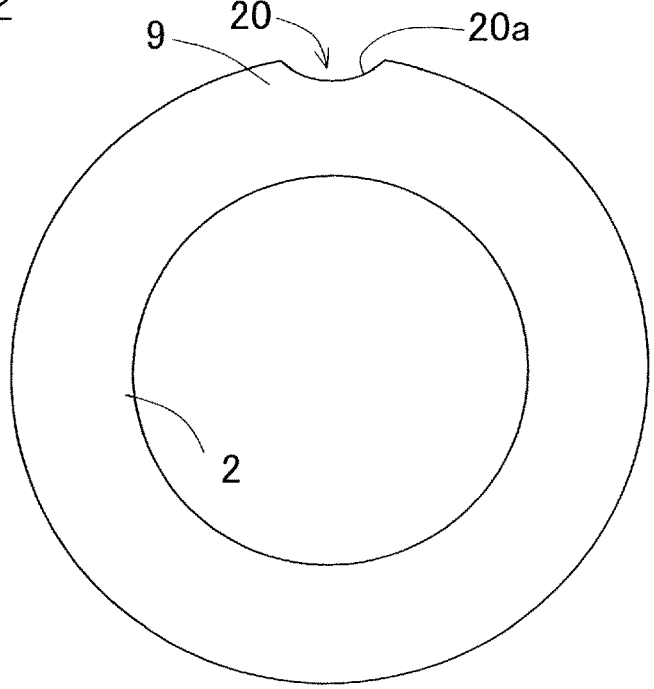
FIG. 12 is an end view of the insertion slot of the inner ring, etc., as seen from an axial direction.

In a double-row self-aligning roller bearing according to a fifth embodiment, as shown in FIG. 11, of the respective small flanges 8 and 9 (FIG. 6) of the inner ring 2, the small flange 9 that faces the axially outer end faces of the rollers 5 in the row that receives an axial load may have an insertion slot 20 for inserting the rollers 5 into the bearing. As shown in FIG. 12, an insertion slot 20 having a circular arc shape is provided at one location in the circumferential direction on the small flange 9 of the inner ring 2. The radius of curvature of a circular arc 20a of the insertion slot 20 is set as appropriate in accordance with the maximum diameter of the rollers 5 (FIG. 11) to be inserted. In the case where such an insertion slot 20 is provided to the inner ring 2, fittability of the rollers 5 in the row that receives an axial load, into the bearing can be further improved.

Figure 13:
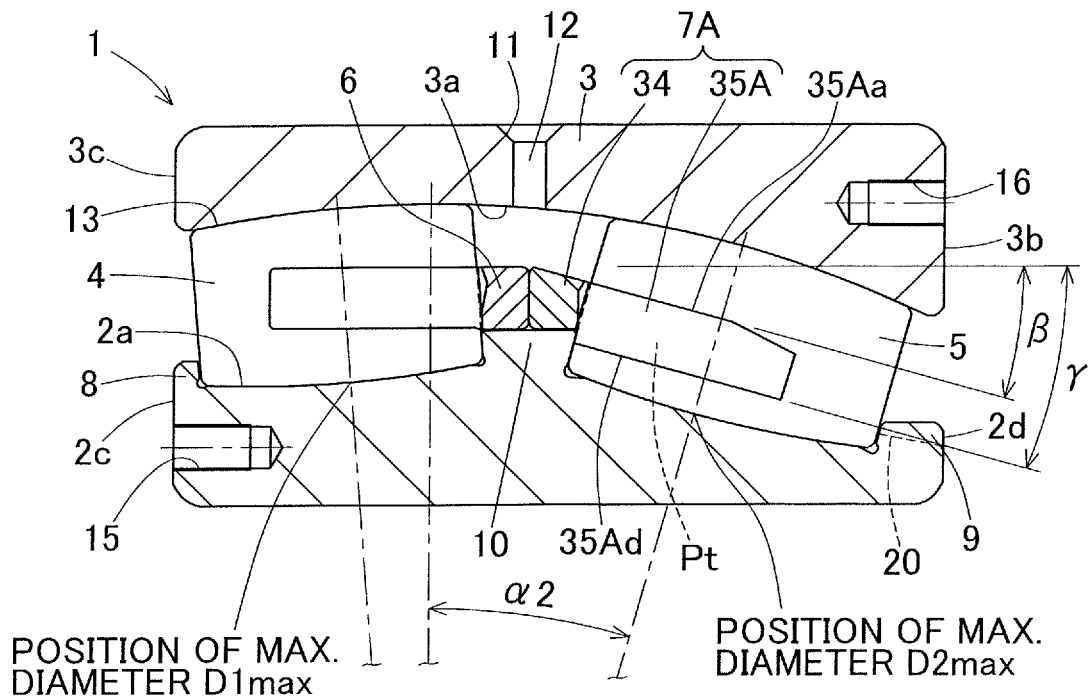
FIG. 13 is a cross-sectional view of a double-row self-aligning roller bearing according to a sixth embodiment of the present invention.

In the double-row self-aligning roller bearing according to the sixth embodiment, as shown in FIG. 13, the inclination angle β of the radially outer surface 35Aa of each pillar portion 35A in the retainer 7A for the right row may be set within a range of greater than zero and not greater than the maximum diameter angle α2 of the rollers 5 in the right row, and the inclination angle γ of the radially inner surface 35Ad of each pillar portion 35A may be set so as to be equal to the inclination angle β of the radially outer surface 35Aa. The inclination angle β in this example is set to an angle that is not greater than the maximum diameter angle α2 and substantially close to the maximum diameter angle α2. In addition, the radially inner surface 35Ad of the pillar portion 35A is composed of only an inclined surface portion, and the above-described flat surface portion is not provided therein.

According to the configuration in FIG. 13, since the retainer 7A has the above-described inclination angle β, the pocket Pt surfaces of the retainer 7A are more assuredly maintained around the position of the pitch circle diameter of the rollers 5, so that the pocket Pt surfaces of the retainer 7A can smoothly and assuredly hold the maximum diameter positions of the rollers 5 during operation of the bearing. In addition, fitting of the rollers 5 can also be performed more easily.

Figure 14:
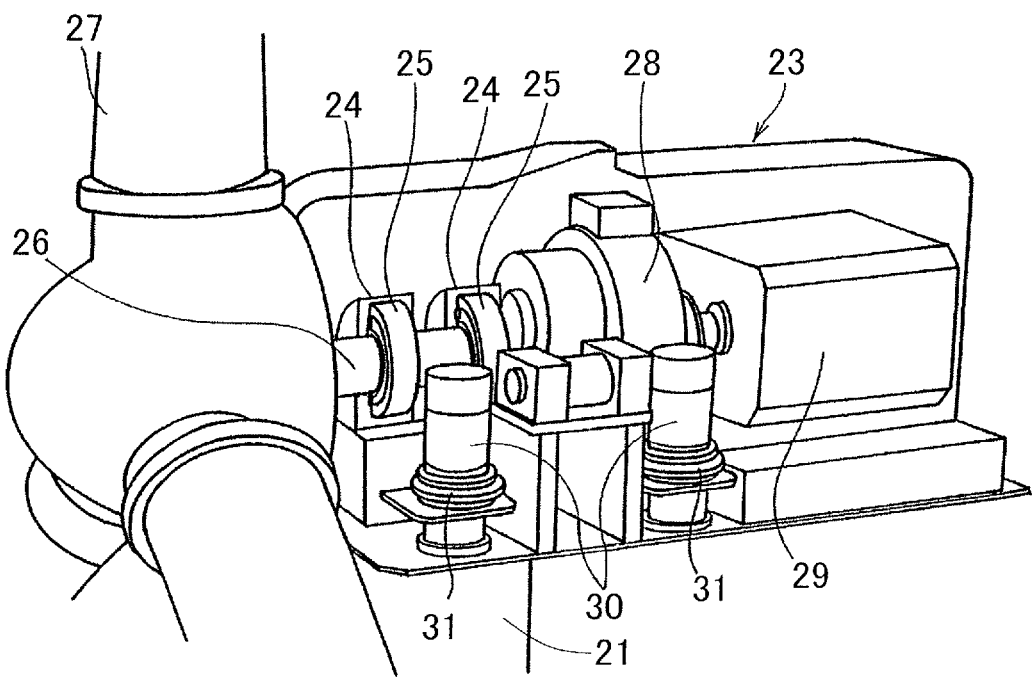
FIG. 14 is a partially cutaway perspective view of an example of a main shaft supporting device of a wind power generator.
Figure 15:
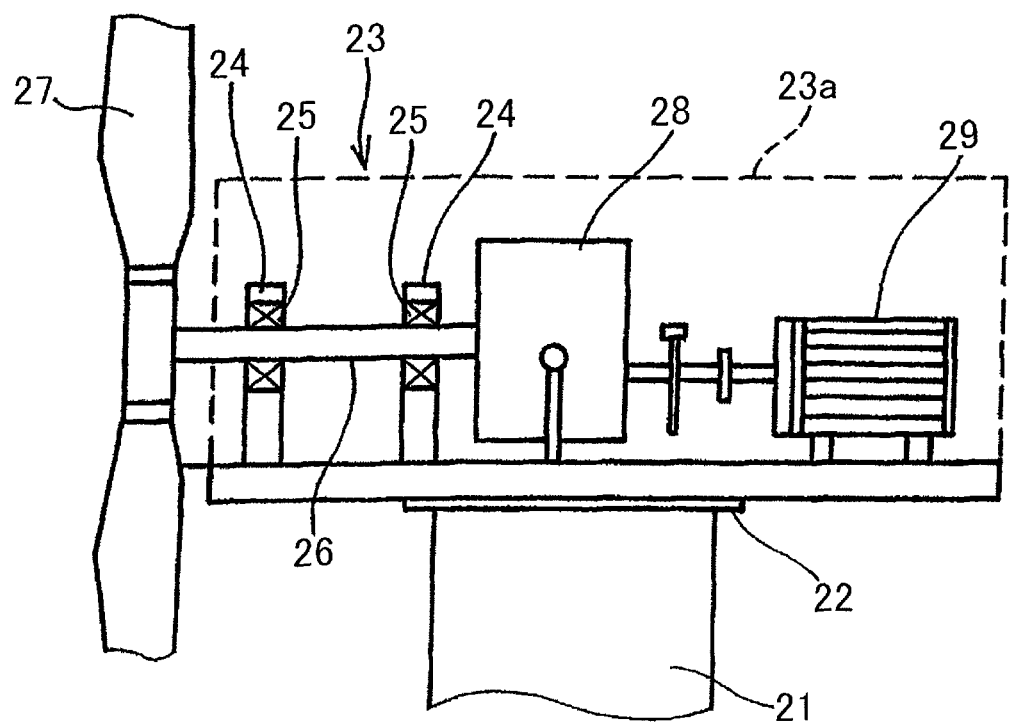
FIG. 15 is a cutaway side view of the main shaft supporting device.
Figure 16:
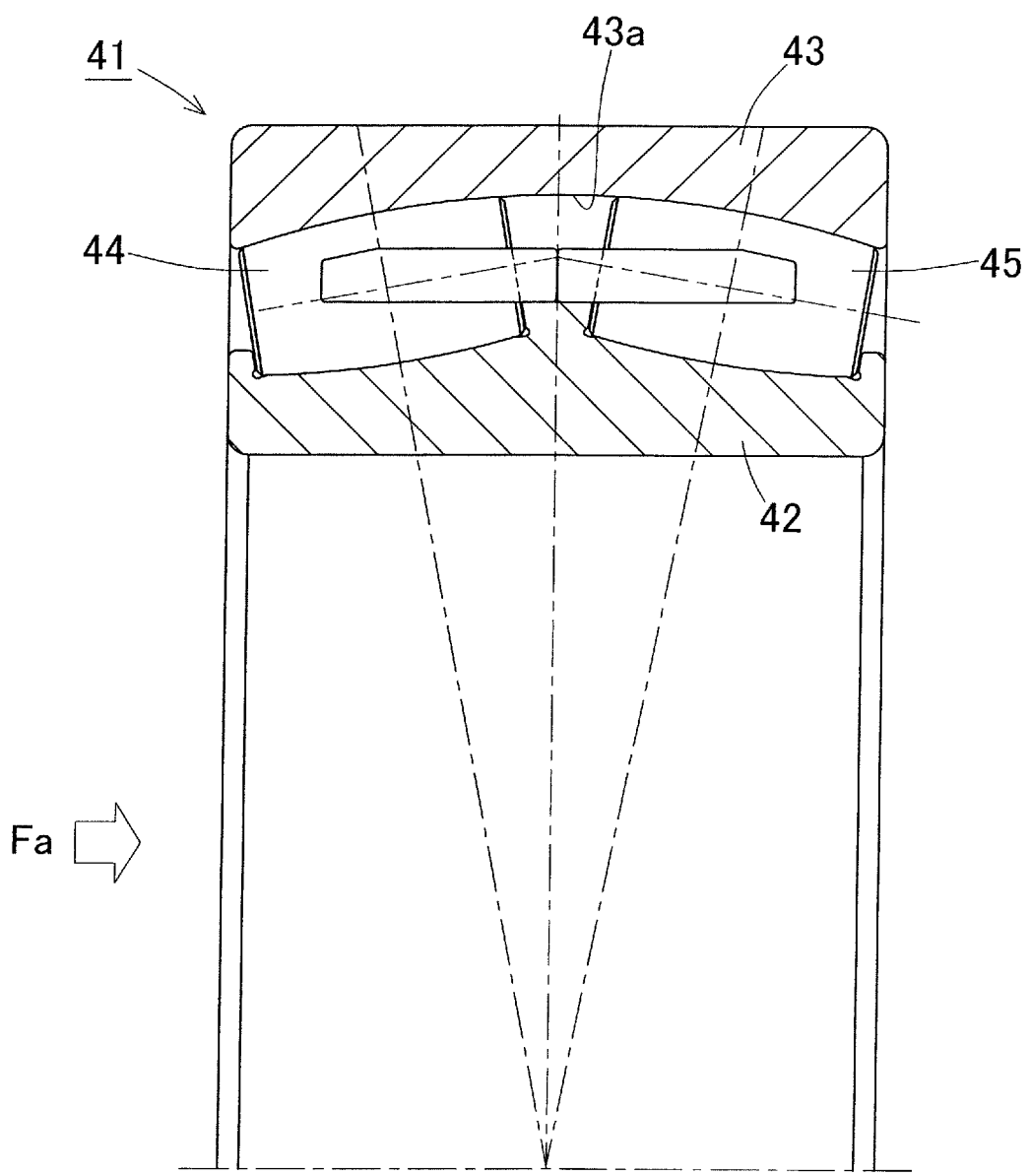
FIG. 16 is a cross-sectional view of a conventional general double-row self-aligning roller bearing.
Figure 17:
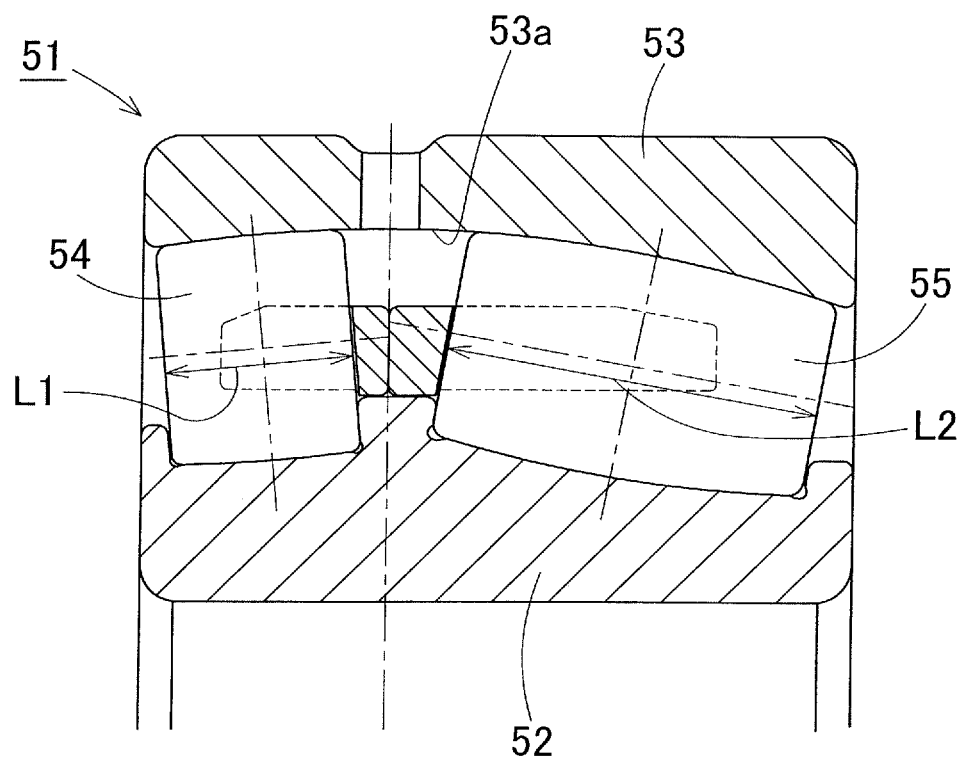
FIG. 17 is a cross-sectional view of a double-row self-aligning roller bearing of a first proposed example.
Figure 18:
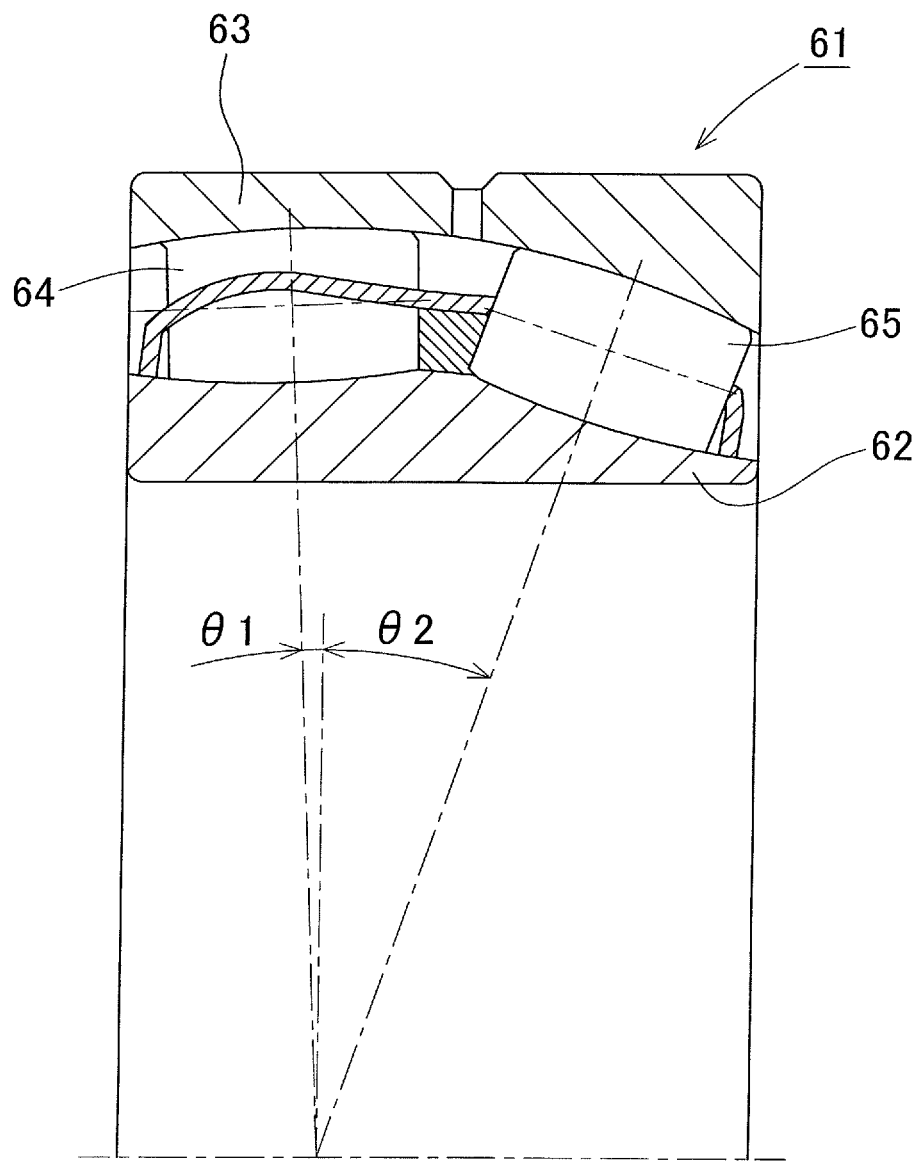
FIG. 18 is a cross-sectional view of a double-row self-aligning roller bearing of a second proposed example.
Figure 19:
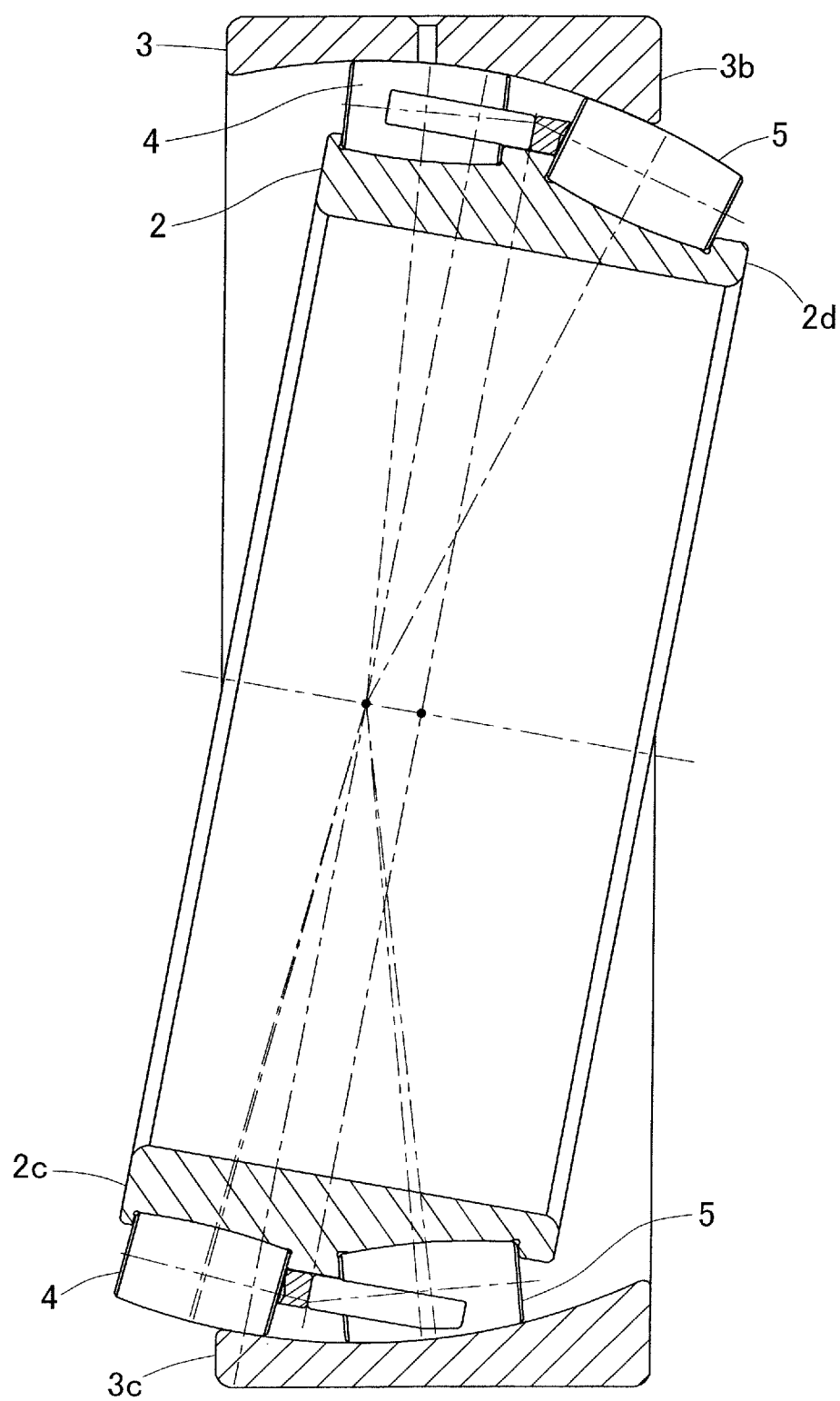
FIG. 19 is a cross-sectional view showing a state where an inner ring and an outer ring of a double-row self-aligning roller bearing are inclined relative to each other with respect to a state where the inner ring and the outer ring confront each other.

FIG. 14 and FIG. 15 show an example of a main shaft supporting device of a wind power generator. A casing 23a of a nacelle 23 is provided on a support stand 21 via a slewing ring bearing 22 (FIG. 15) so as to be horizontally slewable. A main shaft 26 is rotatably provided within the casing 23a of the nacelle 23 via main shaft supporting bearings 25 provided in bearing housings 24. Blades 27 as a swirler are mounted on a portion of the main shaft 26 that projects outside the casing 23a. The other end of the main shaft 26 is connected to a speed increaser 28, and an output shaft of the speed increaser 28 is connected to a rotor shaft of a generator 29. The nacelle 23 is slewed at an arbitrary angle via a speed reducer 31 by a slewing motor 30.

There are two main shaft supporting bearings 25 that are aligned in the illustrated example, but the number of main shaft supporting bearings 25 may be one. The double-row self-aligning roller bearing 1 of any of the embodiments described above is used as each main shaft supporting bearing 25. In this case, both a radial load and an axial load act on the row farther from the blades 27, and thus the rollers 5 having the larger contact angle θ2 are used as the rollers in the row farther from the blades 27. Only the radial load mainly acts on the row closer to the blades 27, and thus the rollers 4 having the smaller contact angle θ1 are used as the rollers in the row closer to the blades 27.

The present invention is not limited to the above-described embodiments, and various additions, changes, or deletions can be made without departing from the gist of the present invention. Therefore, these are construed as included within the scope of the present invention.

REFERENCE NUMERALS

1 . . . Double-row self-aligning roller bearing
2 . . . Inner ring
2c, 2d . . . End surface
3 . . . Outer ring
3a . . . Raceway surface
3b, 3c . . . End surface
4, 5 . . . Roller
6, 7, 7A . . . Retainer
8, 9 . . . Small flange
10 . . . Intermediate flange
13 . . . Roller rolling surface
14 . . . DLC coating
15, 16 . . . Attachment hole
17 . . . Protrusion prevention jig
18 . . . Contact member
19 . . . Fixing member
20 . . . Insertion slot
26 . . . Main shaft
32, 34 . . . Annular portion
33, 35, 35A . . . Pillar portion
60 . . . Shaft
70 . . . Housing
θ1, θ2 . . . Contact angle
Cw . . . Crowning

What is claimed is:

1. A double-row self-aligning roller bearing comprising:
an inner ring;
an outer ring having a spherical raceway surface; and
rollers in two rows juxtaposed to each other in a bearing width direction and interposed between the inner ring and the outer ring, each of the rollers in the two rows having an outer circumferential surface having a cross-sectional shape that matches the raceway surface of the outer ring, wherein either or both of shapes and contact angles of the rollers in the two rows are different from each other, an end surface of either or each of the inner ring and the outer ring is formed with a plurality of attachment holes, each attachment hole of the plurality of attachment holes is attached with only one protrusion prevention jig of a plurality of protrusion prevention jigs for preventing protrusion of the end surface of the inner ring in the bearing width direction with respect to the end surface of the outer ring due to the inner ring and the outer ring being inclined relative to each other with respect to a state where the inner ring and the outer ring confront each other.

2. The double-row self-aligning roller bearing as claimed in claim 1, wherein the attachment hole is a threaded hole.

3. The double-row self-aligning roller bearing as claimed in claim 1, further comprising retainers configured to retain the rollers in the respective rows, wherein each retainer includes an annular portion that has an annular shape and is configured to guide axially inner end faces of the rollers in the row, and a plurality of pillar portions that extend in an axial direction from the annular portion and that are provided at predetermined intervals along a circumferential direction, pockets configured to retain the rollers are provided between those pillar portions, and one of the retainers configured to retain the rollers in a row that is configured to receive an axial load has an inclination angle by which a radially outer surface of each pillar portion is inclined radially inward from a proximal end side toward a distal end side.

4. The double-row self-aligning roller bearing as claimed in claim 1, wherein each of the rollers has a DLC coating on a roller rolling surface thereof.

5. The double-row self-aligning roller bearing as claimed in claim 1, wherein each of the rollers has a crowning at an end portion of a roller rolling surface thereof, and has the outer circumferential surface having a cross-sectional shape that matches the raceway surface of the outer ring with an exception of the end portion having the crowning.

6. The double-row self-aligning roller bearing as claimed in claim 1, wherein the inner ring includes an intermediate flange that is provided on an outer circumferential surface of the inner ring between the rollers in the two rows and configured to guide the rollers in the two rows, and small flanges that are provided at opposite ends of the outer circumferential surface, respectively, and that face axially outer end faces of the rollers in the respective rows, and one small flange of the respective small flanges of the inner ring, that faces the axially outer end faces of the rollers in a row that receives an axial load, has an insertion slot for inserting the rollers into the bearing.

7. A method for installing the double-row self-aligning roller bearing as claimed in claim 1 to a shaft or a housing, the method comprising installing the double-row self-aligning roller bearing into the shaft or the housing in a state where the protrusion prevention jig prevents protrusion of the end surface of the inner ring in the bearing width direction with respect to the end surface of the outer ring due to the inner ring and the outer ring being inclined relative to each other with respect to a state where the inner ring and the outer ring confront each other.

8. The double-row self-aligning roller bearing as claimed in claim 1, wherein the attachment hole is located on only the end surface of one end of the inner ring and the end surface of the other end of the outer ring.

9. The double-row self-aligning roller bearing as claimed in claim 1, wherein an axial length of the inner ring and an axial length of the outer ring are equal to each other.

10. The double-row self-aligning roller bearing as claimed in claim 1, wherein the attachment hole is located on a radially wider end of the inner ring or the outer ring.

11. A protrusion prevention device to be used for a double-row self-aligning roller bearing comprising:

an inner ring;

an outer ring having a spherical raceway surface; and rollers in two rows juxtaposed to each other in a bearing width direction and interposed between the inner ring and the outer ring, each of the rollers in the two rows having an outer circumferential surface having a cross-sectional shape that matches the raceway surface of the outer ring, wherein either or both of shapes and contact angles of the rollers in the two rows are different from each other, an end surface of either or each of the inner ring and the outer ring is formed with a plurality of attachment holes, each attachment hole of the plurality of attachment hole-holes is attached with only one protrusion prevention jig of a plurality of protrusion prevention jigs for preventing protrusion of the end surface of the inner ring in the bearing width direction with respect to the end surface of the outer ring due to the inner ring and the outer ring being inclined relative to each other with respect to a state where the inner ring and the outer ring confront each other, the protrusion prevention device comprising the plurality of protrusion prevention jigs, each comprising:

a contact member configured to be placed on each of end surfaces at the same side in the bearing width direction of the inner ring and the outer ring; and a fixing member configured to be inserted into the attachment hole and fix the contact member to one race ring out of the inner ring and the outer ring that is provided with the attachment hole.

* * * * *

UNITED STATES PATENT AND TRADEMARK OFFICE
CERTIFICATE OF CORRECTION

PATENT NO. : 10,883,544 B2
APPLICATION NO. : 16/507661
DATED : January 5, 2021
INVENTOR(S) : Kazumasa Seko et al.

Page 1 of 1

It is certified that error appears in the above-identified patent and that said Letters Patent is hereby corrected as shown below:

In the Claims

Column 16, Line 37:
In Claim 11, delete "hole-holes" and insert -- holes --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*